United States Patent [19]

Myrman

[11] Patent Number: 4,564,893
[45] Date of Patent: Jan. 14, 1986

[54] METHOD, APPARATUS AND PRODUCT FOR ILLUMINATING A SURFACE TO PROVIDE A DESIRED LIGHT INTENSITY AT DISCRETE POINTS ON SAID SURFACE

[75] Inventor: Nicholas M. Myrman, Rialto, Calif.

[73] Assignee: Sunkist Growers, Inc., Sherman Oaks, Calif.

[21] Appl. No.: 540,126

[22] Filed: Oct. 7, 1983

[51] Int. Cl.⁴ ................................................ F21V 5/00
[52] U.S. Cl. ..................................... 362/311; 350/166; 350/314; 356/433; 356/225
[58] Field of Search ........................ 362/257, 311, 351; 350/314, 164, 166, 266; 356/432, 433, 225, 234; 250/221, 237 R; 364/225

[56] References Cited

U.S. PATENT DOCUMENTS

| | | | |
|---|---|---|---|
| 1,973,792 | 9/1934 | Barrows . | |
| 2,004,798 | 6/1935 | Poser | 240/1 |
| 2,384,578 | 9/1945 | Turner | 95/81 |
| 3,074,313 | 1/1963 | Young et al. | 88/24 |
| 3,312,143 | 4/1967 | Karow et al. | 88/24 |
| 3,413,065 | 11/1968 | Funk | 250/237 R |
| 3,558,208 | 1/1971 | Hudson | 350/8 |
| 3,755,681 | 8/1973 | Montross | 250/237 R |
| 3,771,857 | 11/1973 | Thomasson et al. | 350/166 |
| 4,298,275 | 11/1981 | Critchlow et al. | 355/71 |

FOREIGN PATENT DOCUMENTS 512450 9/1939 United Kingdom .

Primary Examiner—William A. Cuchlinski, Jr.
Attorney, Agent, or Firm—Paul R. Wylie

[57] ABSTRACT

A method and apparatus for illuminating a surface to provide a desired light intensity. The light intensity at discrete points along the illuminated surface is measured through a light transparent material, and opaque materials are applied to the transparent material to block out some of the light and thereby produce a light filter such that the desired intensity at each of the discrete points along the surface is obtained. An oscilliscope, or alternatively, a computer display to indicate light intensity are used.

13 Claims, 5 Drawing Figures

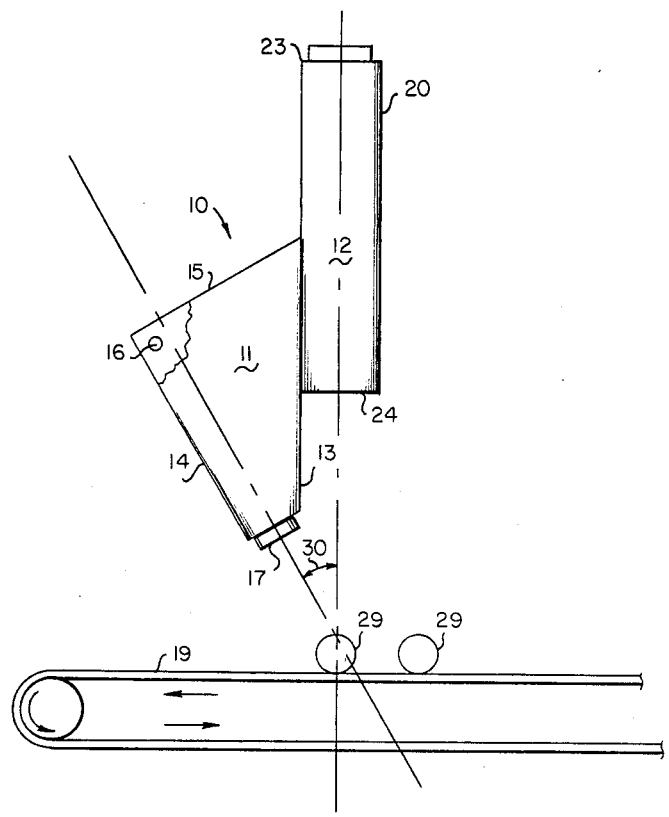
FIG. 1
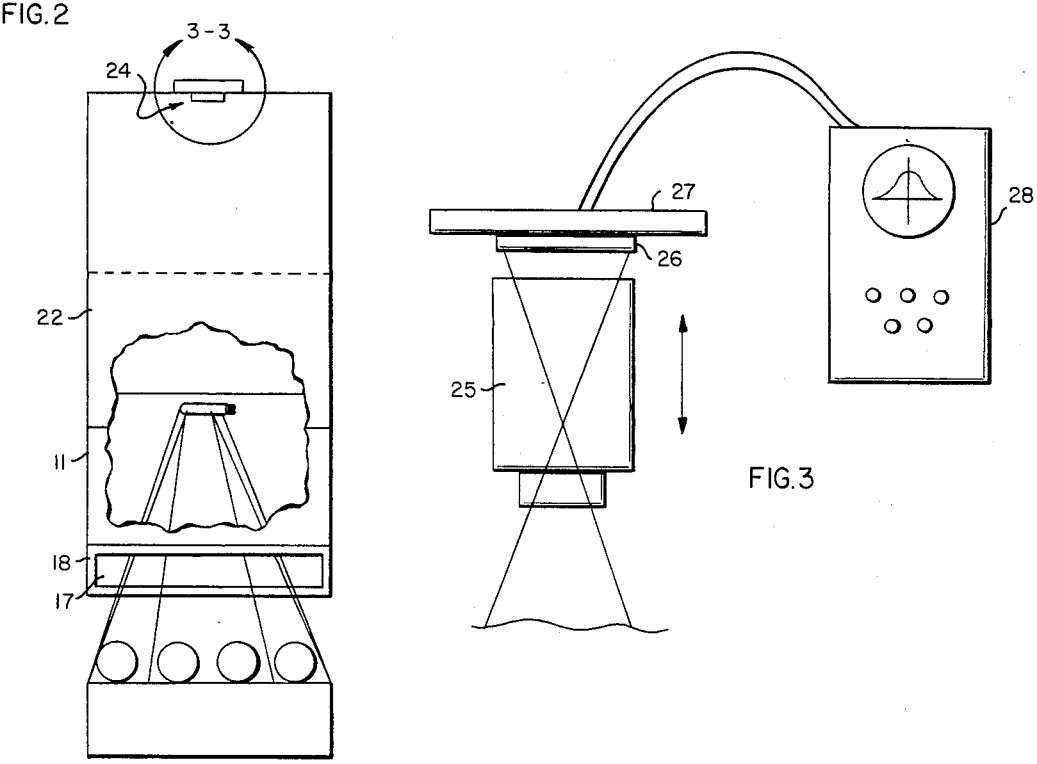
FIG. 2
FIG. 3

METHOD, APPARATUS AND PRODUCT FOR ILLUMINATING A SURFACE TO PROVIDE A DESIRED LIGHT INTENSITY AT DISCRETE POINTS ON SAID SURFACE

BACKGROUND OF THE INVENTION

There is a need in connection with industrial processes and certain electronic quality control apparatus for techniques for providing a desired light intensity at discrete points on a surface. In particular, in connection with the use of apparatus for handling and counting fresh fruit, there is a current need to have a constant illumination on all points of a flat surface.

According to this invention, there is provided a novel method, apparatus and product for illuminating a surface to provide a desired light intensity at discrete points along said surface.

SUMMARY

This invention relates generally to improvements in providing desired light intensity on an illuminated surface.

The invention includes both method and apparatus for illuminating a surface to provide a desired light intensity. The method, according to a specific embodiment of the invention, includes the steps of positioning a light source at a distance from the surface, positioning a light transparent material intermediate the light source and the surface and illuminating the surface through the filter. The light intensity at discrete points along the illuminated surface is then measured and opaque materials are applied to said transparent material in response to said measurement to block out some of the light and thereby produce a light filter such that the desired intensity at each of said discrete points along its surface is obtained. Apparatus is provided according to the invention for carrying out the foregoing techniques.

In one specific form of this invention, the initial light intensity on the surface is transmitted electronically to an oscilliscope whereon a light intensity curve is produced corresponding to the intensity of light along the illuminated surface. Subsequently, opaque materials are applied to the light transparent material in positions to form a filter such that the desired oscilliscope curve is attained. In the case of a desired constant light intensity along the surface, this curve will be substantially flat.

In another aspect of the invention, a light sensing device is electronically connected to a computer which in turn is electronically connected to a computer display device, such as a computer plotter. Light intensities corresponding to the intensity of light along said illuminated surface are inputted to said computer and outputted to said computer plotter. In this aspect of the invention, the computer can be programmed in a manner such that the computer plotter draws out a light filter pattern to attain the desired light intensity along said surface.

There is further provided according to the invention a filter produced according to the method of the invention capable of providing desired intensity of light along an illuminated surface.

In one specific embodiment of the invention, the method and apparatus are used in connection with apparatus for counting fresh fruit and other objects wherein an illuminated surface with substantially constant light intensity along the surface is required. A feature of this embodiment of the invention is the utilization of the existing electronic sensing components of the counting apparatus components to measure the intensity at discrete points along the illuminated surface. Such a counting apparatus is described in U.S. Pat. No. 4,139,766 issued Feb. 13, 1979 and entitled "Apparatus and Method for Counting Fruits and Other Objects".

It was an object of this invention to provide an illuminated surface having substantially constant light intensity along said surface.

A further object of this invention was the provision of a method, apparatus and product for providing substantial illumination along a surface to be utilized in connection with existing electronic apparatus for counting fresh fruit and other objects.

A further object of this invention is the provision of a method, apparatus and product for obtaining substantially constant illumination on a surface wherein a light filter product can be produced by such method and for use in such apparatus utilizing existing illuminating apparatus and whereby a custom made filter can be provided for each installation.

In attempting to provide a method, apparatus and product for the constant illumination of a surface to meet the objects of the invention, there has been developed a novel apparatus, method and a light filter product as will be described hereinafter.

DESCRIPTION OF THE DRAWINGS

The invention will be more fully understood by referring to the accompanying drawing wherein:

FIG. 1 is a side elevation view of the apparatus according to the invention with a portion thereof broken away for convenience of illustration; and FIG. 2 is a front elevation view of the apparatus according to the invention with portions thereof broken away for convenience of illustration; and FIG. 3 is an enlarged schematic view of the light sensing device used in connection with the invention.

DETAILED DESCRIPTION OF THE INVENTION

Figure 4:
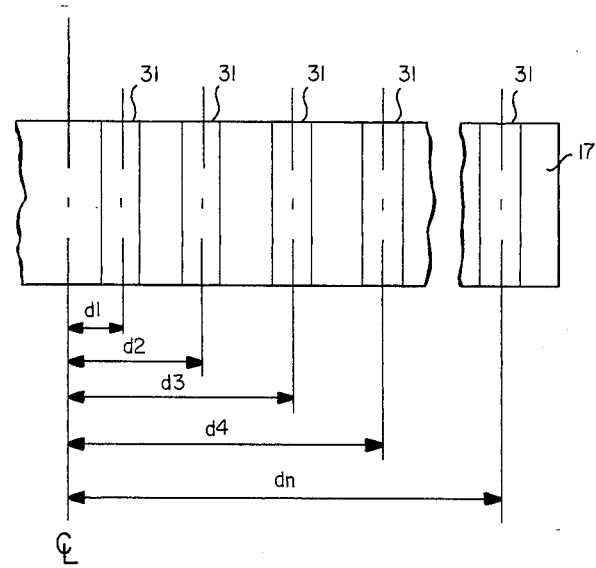
FIG. 4 is a schematic view showing details of the filter utilized and developed in connection with the invention.

With reference to the drawing generally described above, the following is a detailed description of the invention wherein there is provided an apparatus for illuminating a surface to provide a desired light intensity. As shown in FIG. 1, a specific embodiment of such apparatus includes a housing 10 including a light directing portion 11 and a light sensing portion 12. Light directing portion 11 includes a front wall 13, back wall 14 and a top wall 15. A light source 16 is positioned in the housing and can be provided by a single incandescent bulb in a preferred form of the invention. Light from source 16 is directed out of housing 11 through light filter 17 which is held by filter frame 18. The light from housing 11 illuminates a surface, which in this case is provided by conveyer belt 19.

The light sensing section 12 includes a front wall 20 and back wall 21. These walls are joined by side wall 22 and top wall 23 which form a rectangular box like structure with an open end at 24 through which the light on surface 19 can be measured. Light reflected from surface 19 is sensed by light measuring device 24.

Light sensing device 24 includes an adjustable lens 25 and a light sensitive diode array 26, capable of sensing the intensity of light at discrete points along surface 19. The light sensitive diode array 26 can be substituted with a charged coupled device or other device capable of sensing light at discrete points if desired. The diode array 26 is electronically coupled to a micro-circuit 27 which is electronically coupled to an oscilloscope 28 in accordance with one embodiment of the invention. According to another embodiment of the invention, the support circuitry 27 can be coupled electronically to a computer and computer display device (not shown). The computer display device can be either a cathode ray tube or a computer plotter.

In a preferred form of this invention, the surface to be illuminated, as shown as the upper flight of conveyor belt 19, can be used in connection with a counting device for fresh fruit. According to a feature of the invention, the counting device for fresh fruit can utilize camera 25, diode array 26, and support circuitry 27 as part of the electronic system for counting. Inasmuch as it is important that the light intensity on the upper flight of conveyor belt 19 be of substantially constant value across the width of said belt, the apparatus and method of the invention find ready utility in this environment. Fresh fruit, for example oranges 29, are moved in groups passed illuminating apparatus 10 where they are automatically counted.

It will be noted that the light directing portion of illuminating apparatus 10, namely portion 11, and light sensing section 12 are positioned at an angle from each other as shown by element 30, such that the intersections of the respective axis of said light source 16 and light detecting means 24 will be at a point generally the same as the top surface of the items being counted on conveyor belt 19. Thus, in this embodiment of the invention, the intensity can be determined for the point at which the light will be reflected from the tops of the items being counted rather than at some other position.

In FIG. 4 of the drawing, there is shown a light filter 17 according to the invention, wherein opaque materials 31 have been applied in accordance with the invention. In this case, opaque materials 31 comprise elongate rectangular strips of substantially constant width that are spaced unequal distances apart as dictated by calculation techniques that will be hereinafter described.

According to the method of the invention, a surface 19 to be illuminated with a desired light intensity is so illuminated by positioning a single light source 16 at a distance from said surface 19 and positioning a transparent material, which is later used to make light filter 17, in the position of said filter intermediate said light source 16 and said surface 19. The light source 16 illuminates surface 19 and the light intensity at discrete points along the illuminated surface is measured through light measuring device 24 wherein light reflected from said surface 19 is directed by adjustable camera lens 25 onto diode array 26 which senses the light intensity at discrete points on surface 19. In a preferred form of the invention, the light sensed by diode array 26 is converted to electronic signals through support circuitry 27 which is electronically coupled to an oscilliscope 28. The oscilliscope 28 produces a light intensity curve on its screen corresponding to the intensity of light along illuminated surface 19. If the transparent material which is to be made into light filter 17 is completely clear, a light intensity curve such as that shown in FIG. 5 will be produced on said oscilloscope 28. As will be observed in FIG. 5, for example, the light intensity at the center of the surface can be represented, for example, by a figure of 5 volts whereas the light intensity at the edges of surface 19 may be represented, for example, by a figure of 2.5 volts. In order to establish a constant illumination across surface 19, it will therefore be necessary to establish a constant illumination intensity of 2.5 volts. According to techniques developed in connection with the method of this invention, the position of opaque materials 31 of constant width on the transparent material to produce filter 17 to provide such constant illumination intensity can be determined by utilizing the formula $$d_n = \frac{W}{1 - \frac{T_n \%}{100}} + d_{n-1}$$

Where W equals width of the opaque materials and $T_n$ equals percent transmittance and $d_n$ is the distance of the center line of each opaque strip from the center line of filter 17.

Figure 5:
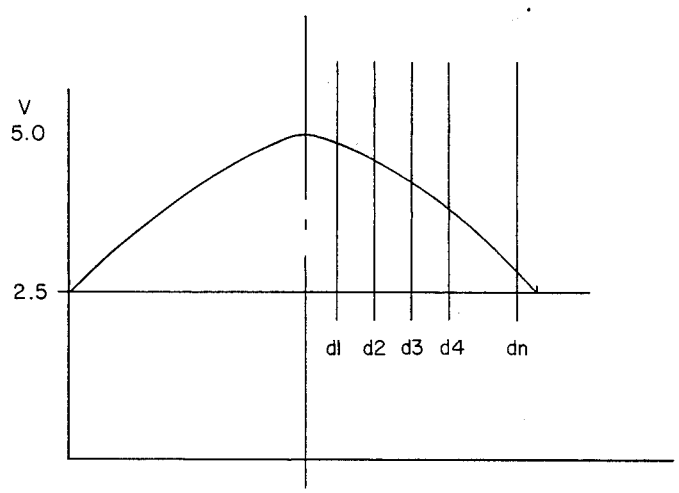
FIG. 5 is a pictorial representation of a typical oscilliscope curve used in connection with one aspect of the invention illustrating the calculation techniques developed in accordance with the invention.

The formula is used in applying opaque materials to make filter 17 in a manner which first involves assigning transmittance percent values for arbitrarily preselected points n along the surface to be illuminated. For example, if belt 19 is 36 inches wide, 36 points one inch apart can be selected and a transmittance value calculated for each point according to the formula $T\% = V \text{ (Final)}/V \text{ (Actual)} \times 100$ where V is equal to the voltage represented on an oscilliscope curve. Referring to FIG. 5, V ((Final) can be taken as the lowest illumination voltage, or 2.5 V, on the curve with V (Actual) being taken as the value selected from said curve corresponding to each preselected point. Starting in the center of the filter, a first opaque tape, can be placed down, with its center line a distance $d_1$ from the filter center line as determined from the above formula. A second tape is placed down a distance $d_2$ from the filter center line according again to the above formula. This procedure is repeated for each additional tape until the entire filter is constructed. Interpolated transmittance values can be used for tapes found to overlap the arbitrarily selected transmittance value points.

While opaque materials in the form of rectangles of constant width are shown in FIG. 4, such materials can also be a variable width and applied using modified techniques including those in which desired transmittance values are determined for areas of equal width along an axis transverse of the center line of a filter 17 and the width of tapes placed on such areas are those which will result in the desired transmittance.

In accordance with one embodiment of the invention wherein the oscilliscope technique can be replaced with a computer and computer plotter, the computer plotter can be used to print out the opaque areas on a sheet material which can either be applied directly to the light transparent material to make the filter 17 or used as a template or design for opaque materials for such filter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. The method of illuminating a surface to provide a desired light intensity comprising:
   a. positioning a single light source at a distance from said surface;
   b. positioning a light transparent material, intermediate said light source and said surface;
   c. illuminating said surface through said light transparent material;
   d. measuring the light intensity at discrete points along the illuminated surface by means of a light sensing device being capable of sensing light intensity at discrete points along said surface said light sensing device being electronically connected to an oscilliscope and wherein a light intensity curve corresponding to the intensity of light along said illuminated surface is produced on said oscilliscope; and
   e. applying opaque materials to said light transparent material in response to said measurement to block out some of the light such that the desired intensity at each of said discrete points along said surface will be obtained and said light intensity curve on said oscilliscope is adjusted to the desired light intensity along said illuminated surface.

2. A method according to claim 1 further comprising the step of photographing the oscilliscope curve to produce an oscilliscope trace, assigning percent light transmittance values to preselected points on said oscilliscope trace ranging from 0% to 100% and applying opaque strips of equal width to the light transparent material according to the formula:

$$d_n = \frac{W}{1 - \frac{T_n\%}{100}} + d_{n-1}$$

wherein $d_n$ equals total distance of the center line of said opaque strip to the center line of said filter; W equals the width of said opaque strips and $T_n\%$ equals the percent assigned light transmittance at such preselected points.

3. The method of illuminating a surface to provide a desired light intensity comprising:
   a. positioning a single light source at a distance from said surface;
   b. positioning a light transparent material, intermediate said light source and said surface;
   c. illuminating said surface through said light transparent material;
   d. measuring the light intensity at discrete points along the illuminated surface by means of a light sensing device being capable of sensing light intensity at discrete points along said surface said light sensing device being electronically connected to a computer and a computer display device and wherein a light intensity curve corresponding to the intensity of light along said illuminated surface is produced by said computer on said computer display device; and
   e. applying opaque materials to said light transparent material in response to said measurement to block out some of the light such that the desired intensity at each of said discrete points along said surface will be obtained and said light intensity curve on said computer display device is adjusted to the desired light intensity along said illuminated surface.

4. A method according to claim 1 or 3 wherein said opaque materials are elongate rectangular strips of constant width.

5. A method according to claim 1 or 3 wherein said opaque materials are elongate rectangular strips of variable width.

6. A method according to claim 3 wherein said computer display device is a computer printer and said computer prints out a filter pattern which can be applied to said light transparent material to attain the desired light intensity along said illuminated surface.

7. A method according to claim 1 or 3 wherein said light source is an unequal distance from points along said illuminated surface and wherein the desired light intensity along said surface is substantially constant.

8. An apparatus for illuminating a surface with light of a desired intensity along the axis of said surface comprising a point light source at a distance from said surface and a light filter positioned intermediate said light source and said surface, said filter having opaque materials positioned thereon, said opaque materials having been selectively applied to a light transparent material to form said filter in response to measurement of light intensity at discrete points along said illuminated surface such that the desired intensity at each of said discrete points along said axis will be obtained, said opaque materials being opaque strips of equal width and being positioned on said light transparent material according to the formula:

$$d_n = \frac{W}{1 - \frac{T_n\%}{100}} + d_{n-1}$$

wherein $d_n$ equals total distance of the center lines of said opaque strip to the center line of said filter; W equals the width of said opaque strips and $T_n\%$ equals the percent assigned light transmittance at such preselected points on said filter.

9. An apparatus according to claim 8 wherein said opaque materials are elongate rectangular strips of constant width.

10. An apparatus according to claim 8 wherein said opaque materials are elongate rectangular strips of variable width.

11. A light filter adapted to be used in connection with a single light source to provide light of desired intensity along an axis of a surface to be illuminated by said light source, said filter comprising a transparent base having opaque areas thereon, said opaque materials having been selectively applied to said filter in response to the measurement of light through said filter such that the desired intensity of light on said surface to be illuminated at discrete points along the axis of said surface will be obtained, said opaque materials being opaque strips of equal width and being positioned on said light transparent material according to the formula:

$$d_n = \frac{W}{1 - \frac{T_n\%}{100}} + d_{n-1}$$

wherein $d_n$ equals total distance of the center lines of said opaque strip to the center line of said filter; W equals the width of said opaque strips and $T_n\%$ equals the percent assigned light transmittance at such preselected points on said filter.

12. A light filter according to claim 11 wherein said opaque materials are elongate rectangular strips of constant width.

13. A light filter according to claim 11 wherein said opaque materials are elongate rectangular strips of variable width.

* * * * *